Patented June 13, 1939

2,162,196

UNITED STATES PATENT OFFICE 2,162,196

DYESTUFFS OF THE ANTHRIMIDE-CARBAZOLE SERIES

Joseph Deinet, Milwaukee, Wis., assignor to E. I. du Pont de Nemours & Company, Wilmington, Del., a corporation of Delaware No Drawing. Application October 19, 1936, Serial No. 106,371

5 Claims. (Cl. 260—316)

This invention relates to the preparation of new and valuable dyestuffs of the anthrimide-carbazole series and more particularly to the preparation of homonuclear beta-methyl substituted acidylamino anthrimide-carbazoles of the formula

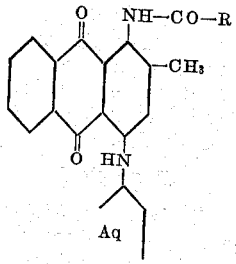

wherein R stands for an aryl radical and Aq stands for an anthraquinone radical which contains an aroylamine group in the 4 or 5 position, which dye cotton in bright shades and which have excellent fastness properties.

I have found that new and valuable dyestuffs may be prepared by condensing 1-acidylamino-2-methyl-4-bromo- (or amino) anthraquinone with amino- (or bromo) anthraquinone compounds containing an aroylamino radical in the 4 or 5 position.

These dyestuffs dye in brighter and more desirable shades than the corresponding anthrimide-carbazoles which do not contain the beta-methyl substituent and they have equally as good fastness properties. The condensation of the aminoanthraquinone and halogen-anthraquinone compounds is carried out by the procedure normally used in the preparation of anthrimides, preferably in an inert organic solvent such as naphthalene, nitrobenzene, etc., and in the presence of an acid binding agent such as sodium carbonate or sodium acetate, and a copper catalyst, at temperatures of from about 170° C. to the boiling point of the solvent used. These condensation products are then converted to the carbazoles by the usual treatment with sulfuric acid or other acid condensing agents, such as aluminum chloride, which effects a ring-closure of the anthrimide linkage.

The following examples are given to more fully illustrate the invention. The parts used are by weight.

Example 1

350 parts of naphthalene are heated to 100° C. While agitating, 35 parts of 1-benzoylamino-2-methyl-4-aminoanthraquinone, 36 parts of 1-benzoylamino-5-chloroanthraquinone, 18 parts of sodium carbonate and 2.5 parts of copper acetate are added. The mass is then heated to 210–212° C. and held for 6 hours. After cooled to 125° C. it is poured into 700 parts of solvent naphtha and filtered at 35° C. The product is washed with solvent naphtha, alcohol, and hot water in turns and dried. 50 parts of the dry condensation product are dissolved in 500 parts of 95% sulfuric acid and stirred for 3½–4 hours at the temperature of 15–17° C. (The color of the mass turns during this time from olive-green to brown-violet.) After the mass is poured into 4500 parts of water, 50 parts of sodium dichromate are added, heated to 90–95° C. and held for 1½–2 hours, filtered and washed free of acid. The product obtained forms an orange-brown paste and dyes cotton from a red-brown vat in bright orange-brown shades of very good fastness properties.

Example 2

350 parts of naphthalene, 35 parts of 1-benzoylamino-2-methyl-4-aminoanthraquinone, 36 parts of 1 - benzoylamino - 4 - chloroanthraquinone, 18 parts of sodium carbonate, and 2.5 parts of copper acetate are heated together, while agitating, to 205–208° C. and held for 4–6 hours. The mass is then cooled to 130° C., poured into 700 parts of solvent naphtha, filtered at 35° C., washed with solvent naphtha, alcohol, and hot water in turns and dried. 50 parts of the dry condensation product are dissolved in 500 parts of 95% sulfuric acid at 10–12° C. and stirred for 4 hours. The mass is then poured into 4500 parts of water. 30 parts of sodium dichromate are added, heated to 90–95° C. and held for 1½ hours. The product is then filtered and washed free of acid, giving a dark brown paste which dyes cotton from a brown vat in dark brown shades with an olive-green cast of very good fastness properties.

Example 3

300 parts of naphthalene, 25 parts of the condensation product of 1-amino-5-chloroanthraquinone with 2-anthraquinone-carboxylic acid chloride, 18 parts of 1-benzoylamino-2-methyl-4-aminoanthraquinone, 12.5 parts of sodium carbonate and 1.5 parts of copper acetate are heated together to 212–215° C. and held for 3½–4 hours. The mass is then cooled to 125° C., poured into 500 parts of o-dichlorobenzene, filtered at 40° C., washed with o-dichlorobenzene, alcohol, and hot water in turns and dried. 30 parts of the dry condensation product are dissolved in 300 parts of 95% sulfuric acid at 15–17° C. and stirred for 4 hours. Then the mass is poured into 2500 parts of water. 30 parts of sodium dichromate are added, heated to 85-90° C. and held for 1½ hours, filtered and washed free of acid. The product obtained forms an orange-brown paste and dyes cotton from a brown vat in orange-brown shades of excellent fastness properties.

Example 4

240 parts of naphthalene, 25 parts of 1-benzoyl-amino-2-methyl-4-bromoanthraquinone, 20 parts of 1-benzoylamino-5-aminoanthraquinone, 12.5 parts of sodium carbonate and 1.5 parts of copper acetate are heated together to 212-215° C. and held for 3½ hours. The mass is then cooled to 125° C., poured into 500 parts of solvent naphtha, filtered at 35° C., washed with solvent naphtha, alcohol, and hot water in turns and dried. 30 parts of the dry condensation product are dissolved in 300 parts of 95% sulfuric acid at 15-17° C. and stirred for 4 hours. After the mass is poured into 2500 parts of water, 30 parts of sodium dichromate are added and it is then heated to 90-95° C. and held for 2 hours, filtered and washed free of acid. The product obtained is identical with that of Example 1.

Example 5

450 parts of naphthalene, 42 parts of 1-benzoylamino-2-methyl-4-bromoanthraquinone, 35.6 parts of 1-benzoylamino-2-methyl-4-aminoanthraquinone, 21 parts of sodium carbonate, and 2.5 parts of copper acetate are heated together to 212-215° C. and held for 3½ hours. The mass is then cooled to 130° C., poured into 900 parts of solvent naphtha, filtered at 35° C., washed with solvent naphtha, alcohol, and hot water in turns and dried. 30 parts of the dry condensation product are dissolved in 300 parts of 97% sulfuric acid at 10-12° C. and stirred for 4 hours. After the mass is poured into 2500 parts of water, 25 parts of sodium dichromate are added, and it is then heated to 85-90° C. and held for 2 hours, filtered and washed free of acid. The product obtained dyes cotton from an orange-brown vat in dark brown shades with a red cast.

Example 6

500 parts of naphthalene, 26 parts of the condensation product of 1,9-isoanthrathiazole-2-carboxylic acid chloride with 1-amino-5-chloroanthraquinone, 18 parts of 1-benzoylamino-2-methyl-4-aminoanthraquinone, 13 parts of sodium carbonate and 1.5 parts of copper acetate are heated together to 212-215° C. and held for 5 hours. The mass is cooled to 140° C., poured into 750 parts of o-dichlorobenzene, filtered at 45° C., washed with o-dichlorobenzene, alcohol, and hot water in turns and dried. 30 parts of the dry condensation product are dissolved in 300 parts of 97% sulfuric acid at 10-12° C. and stirred for 4 hours. After the mass is poured into 2500 parts of water, 20 parts of sodium dichromate are added, and it is heated to 85-90° C. and held for 2 hours, filtered and washed free of acid. The product obtained dyes cotton from a dark violet-brown vat in bright yellow-brown shades.

Example 7

450 parts of naphthalene, 27.5 parts of the condensation product of 2-anthraquinonecarboxylic acid chloride with 1-amino-2-methyl-4-bromoanthraquinone, 17 parts of 1-amino-5-benzoyl-aminoanthraquinone, 14 parts of sodium carbonate and 1.5 parts of copper acetate are heated together to 212-215° C. and held for 3 hours. The mass is then cooled to 130° C., poured into 900 parts of solvent naphtha, filtered at 40° C., washed with solvent naphtha, alcohol, and hot water in turns and dried. 30 parts of the dry condensation product are dissolved in 300 parts of 97% sulfuric acid at 10-12° C. and stirred for 4 hours. The mass is then poured into 2500 parts of water. 20 parts of sodium dichromate are added and then heated to 85-90° C. and held for 2 hours, filtered, and washed free of acid. The product dyes cotton from an orange-red vat in brown shades, with an orange cast.

Example 8

300 parts of naphthalene, 25 parts of the condensation product of 2-anthraquinonecarboxylic acid chloride with 1-amino-5-chloranthraquinone, 18 parts of 1-benzoylamino-2-methyl-4-aminoanthraquinone, 12.5 parts of sodium carbonate and 1.5 parts of copper acetate are heated together to 210-212° C. and held for 3-3½ hours. The mass is then cooled to 140° C., poured into 500 parts of o-dichlorobenzene, filtered at 35° C., washed with o-dichlorobenzene, alcohol, and hot water in turns and dried. 30 parts of the dry condensation product are dissolved in 300 parts of 96% sulfuric acid at 15° C. and stirred for 4 hours, then poured into 2500 parts of water. 30 parts of sodium dichromate are added, and it is then heated to 85° C. and held for 1½-2 hours, filtered and washed free of acid. The product obtained dyes cotton from an orange-red vat in orange-brown shades.

Example 9

350 parts of nitrobenzene, 35.5 parts of 1-benzoyl-amino-2-methyl-4-aminoanthraquinone, 36 parts of 1-benzoylamino-5-chloroanthraquinone, 18 parts of sodium acetate and 1.5 parts of copper powder are heated together to 203-205° C. and held for 6 hours. The mass is then cooled to 25° C., filtered, washed with nitrobenzene, alcohol, and hot water in turns and dried. 30 parts of the dry condensation product are dissolved in 300 parts of 96% sulfuric acid at 15-17° C. and stirred for 4 hours, then poured into 2500 parts of water. 30 parts of sodium dichromate are added and it is heated to 90-95° C. and held for 2 hours, filtered and washed free of acid. The product obtained is identical with that of Example 1.

Example 10

500 parts of naphthalene, 25 parts of the condensation product of 1 mol. of 1,5-diaminoanthraquinone with 1 mol. of 1,9-isoanthrathiazole-2-carboxylic acid chloride, 29 parts of the condensation product of 1-amino-2-methyl-4-bromoanthraquinone with 1,9-isoanthrathiazole-2-carboxylic acid chloride, 15 parts of sodium carbonate and 2.5 parts of copper acetate are heated together to 215° C. and held for 4½ hours. It is then cooled to 150° C., poured into 750 parts of o-dichlorobenzene, filtered at 70° C., washed with o-dichlorobenzene, alcohol, and hot water in turns and dried. 30 parts of the dry condensation product are dissolved in 360 parts of 98% sulfuric acid at 7-15° C. and stirred for 4 hours, then poured into 3000 parts of water. 20 parts of sodium dichromate are added, and it is then heated to 90° C. and held for 1½ hours, filtered and washed free of acid. The product obtained dyes cotton from a violet-blue vat in khaki shades.

Example 11

400 parts of naphthalene, 20 parts of the condensation product of 2,1-anthraquinonebenzacridone-4-carboxylic acid chloride with 1-amino-5-chloroanthraquinone, 11.8 parts of 1-benzoylamino-2-methyl-4-aminoanthraquinone, 10 parts of sodium carbonate and 2 parts of copper acetate are heated together to 212-215° C. and held for 10-12 hours, then cooled to 150° C., poured into 600 parts of o-dichlorobenzene, filtered at 70° C., washed with o-dichlorobenzene, alcohol, and hot water in turns and dried. 20 parts of the dry condensation product are dissolved in 240 parts of 96% sulfuric acid at 7-15° C., and stirred for 4 hours. It is then poured into 2000 parts of water and 15 parts of sodium dichromate are added, heated to 90° C. and held for 1½ hours, filtered and washed free of acid. The product obtained dyes cotton from a red-brown (violet cast) vat in red-brown shades.

Example 12

400 parts of naphthalene, 26 parts of the condensation product of 1-methoxyanthraquinone-6-carboxylic acid chloride with 1-amino-5-chloroanthraquinone, 18 parts of 1-benzoylamino-2-methyl-4-aminoanthraquinone, 13 parts of sodium carbonate and 1.5 parts of copper acetate are heated together to 212-215° C. and held for 5 hours, then cooled to 120° C., poured into 800 parts of solvent naphtha, filtered at 40° C., washed with solvent naphtha, alcohol, and hot water in turns and dried. 30 parts of the dry condensation product are dissolved in 360 parts of 96% sulfuric acid at 7-15° C. and stirred for 4 hours. It is then poured into 3000 parts of water and 20 parts of sodium dichromate are added, and it is heated to 90° C. and held for 1½ hours, filtered and washed free of acid. The product obtained dyes cotton from a dark yellow-brown vat in brown shades with a yellow cast.

Example 13

300 parts of naphthalene, 10 parts of soda ash, 1.5 parts of copper acetate, 14.5 parts of the condensation product of 1-amino-2-methyl-4-bromoanthraquinone with 1-chloroanthraquinone-6-carboxylic acid chloride and 17 parts of 1-amino-4-benzoylaminoanthraquinone are heated together to 212-215° C. and held for 10 hours. It is cooled to 130° C. and 450 parts of o-dichlorobenzene are added, filtered at 50° C., washed with o-dichlorobenzene, alcohol, and hot water in turns and dried. 15 parts of the dry condensation product are dissolved in 150 parts of 97% sulfuric acid at 7-10° C. and stirred for 5 hours, then worked up with 1300 parts of water. 10 parts of sodium dichromate are added. It is then heated to 85-90° C. and held for 1½-2 hours, filtered and washed free of acid. The product dyes cotton from a brown vat in strong dark brown shades (violet cast).

Example 14

450 parts of naphthalene, 21 parts of soda ash, 2.5 parts of copper acetate, 42 parts of 1-benzoylamino-2-methyl-4-bromoanthraquinone and 35.6 parts of 1-benzoylamino-2-methyl-4-aminoanthraquinone are heated to 212-215° C. and held for 3½ hours. It is then cooled to 130° C. and poured into 900 parts of solvent naphtha, filtered at 40° C., washed with solvent naphtha, alcohol, and hot water in turns and dried. 30 parts of the dry condensation product are dissolved in 300 parts of 97% sulfuric acid at 10-12° C. and stirred for 4 hours, then worked up with 2700 parts of water. 25 parts of sodium dichromate are added, and it is then heated to 85-90° C. and held for 1½-2 hours, filtered and washed free of acid. The product dyes cotton from a reddish-brown vat in dull brown shades (reddish cast).

The 1-benzoylamino-2-methyl-4-aminoanthraquinone which is used in the above examples may be prepared by the following procedure.

In 1800 parts of alcohol (93-95%) suspend 300 parts of 1,4-dibenzoylamino-2-methylanthraquinone, then add 300 parts of caustic soda, 40% by weight, heat to 78° C. and hold for 1-1½ hours, cool to 25° C., filter, wash free of alkali and dry. The product is a violet powder.

The 1-aroylamino-2-methyl-4-bromoanthraquinone compounds are prepared by the known methods described in the prior art, for instance by the acidylation of 1-amino-2-methyl-4-bromoanthraquinone.

I claim:

1. New vat dyestuffs of the following formula

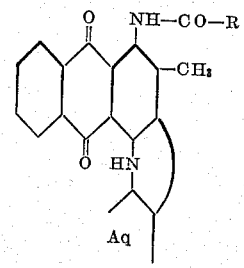

wherein R stands for an aryl radical and Aq stands for an anthraquinone radical which contains an aroylamino group in one of the positions 4 and 5.

2. As new dyestuffs, compounds of the following formula

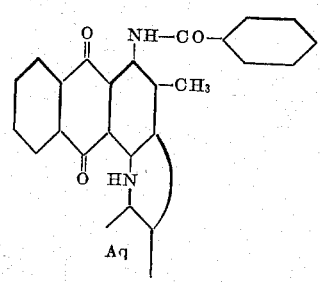

wherein Aq stands for an anthraquinone radical which contains an aroylamino radical in one of the positions 4 and 5.

3. Dyestuffs of the following formula

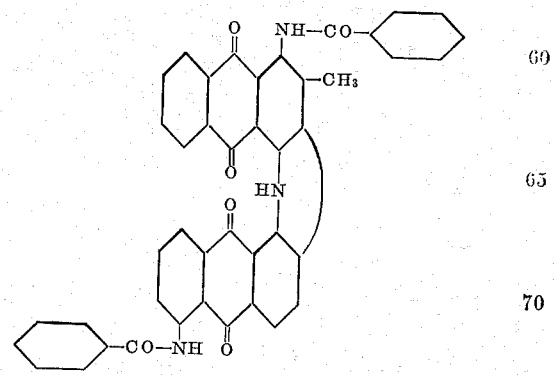

4. The process which comprises condensing an acidylaminoanthraquinone of the following formula

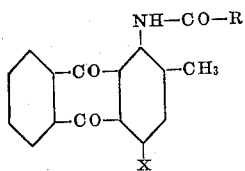

wherein R stands for an aryl radical and X stands for a substituent of the class consisting of $NH_2$ and Br with a compound of the formula

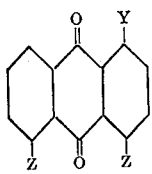

wherein Y stands for a substituent of the class consisting of Br and $NH_2$, one Z stands for an aroylamino radical and the other Z stands for hydrogen, and wherein the X and Y in any one case do not stand for the same substituent, said condensation being carried out in an inert organic solvent and in the presence of an acid binding agent and a copper catalyst, at temperatures of from about 170 to 225° C.

5. The process for preparing the compound of claim 3, which comprises heating 1-benzoylamino-2-methyl-4-aminoanthraquinone with 1-benzoylamino-5-chloroanthraquinone in an inert high boiling organic solvent in the presence of an acid binding agent and a copper catalyst, at temperatures of 170 to 225° C.

JOSEPH DEINET.